Patented May 16, 1939

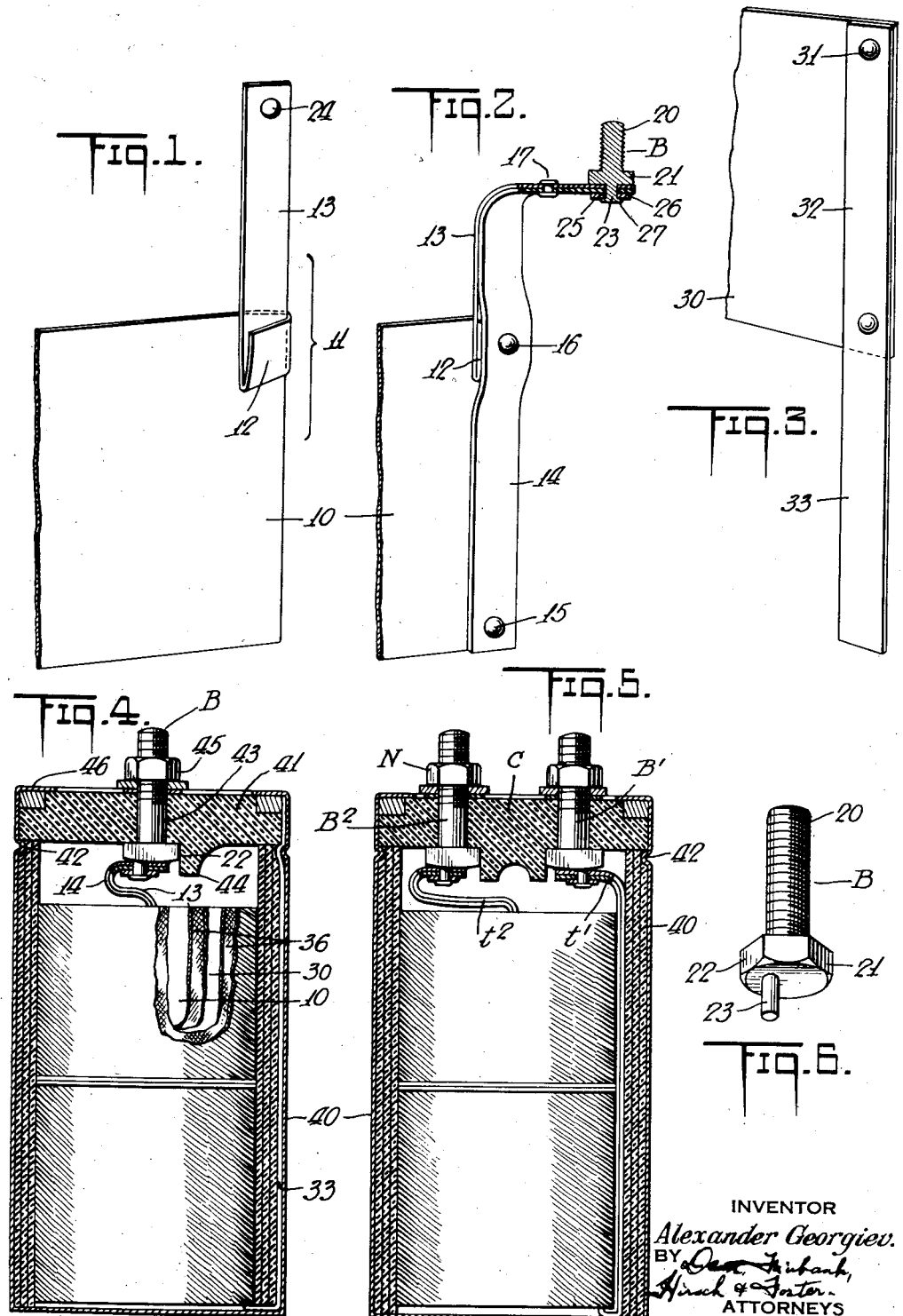

2,158,363

UNITED STATES PATENT OFFICE 2,158,363

ELECTRODE TERMINAL CONSTRUCTION

Alexander Georgiev, Dayton, Ohio, assignor to Aerovox Corporation, a corporation of New York Application October 20, 1931, Serial No. 569,926
Renewed December 31, 1934

6 Claims. (Cl. 175—315)

My present invention is primarily concerned with and has specialized utility in the construction of electrolytically formed cells of the so-called dry type devoid of unabsorbed electrolyte liquid. The invention in its broader aspects is however applicable also to electrostatic condensers in which no electrolytic action is involved, either prior to or during use and in some aspects is applicable to electrolytic apparatus other than condensers such as electrolytic rectifiers, storage batteries, primary cells and the like.

As conducive to a clear understanding of the invention it is noted that in electrical condensers and in electrolytic apparatus generally, involving enrolled electrodes, it is advantageous to employ the thinnest possible metal stock for the electrodes because of the economy in attaining maximum area of electrode with a minimum of bulk, weight and cost. A serious objection to such thin foils however is the fact that the protruding integral terminal tabs are too weak to withstand ordinary handling in the course of assembly and installation in the process of mass production.

An object of the invention is to provide electric apparatus of the above type utilizing extremely thin foil for the electrodes, while maintaining the advantage of the integral terminal tab and yet affording the mechanical strength requisite for effective assembly, installation and use of such apparatus.

Another object is to provide apparatus of the above type, by which reliable and effective connection is established between the terminal tab of the electrode and the binding post, without dependence on the mounting of the reinforcement itself as the agency for effecting the electrical contact and with the avoidance of strain upon the integral terminal tab in the course of effecting the correlation thereof with the binding post.

A feature of the invention is the provision of a reinforce strip affixed preferably by riveting to the width of the electrode strip at one end thereof for protrusion therebeyond the length of the terminal tab, which in the anode foil is preferably integral with the foil. The anode foil which is of extremely thin metal is ordinarily slit transversely, especially in the condenser application, at one end thereof, and the tongue thus formed is reversely bent and laterally turned over to bring the outer edge of the tab into alignment with the end of the foil. The reinforce strip is preferably of metal identical with that of the foil, of the width of the tab and of length equal to the combined width of the foil and length of the tab to both of which it is preferably affixed by rivets of metal identical with the foil and the reinforce strip. For the cathode foil, it is generally sufficient to use the reinforce strip in the absence of any integral terminal tab on the foil.

Another feature of the invention is the pre-assembly of the electrode with its protruding terminal tab to the binding post, which latter is to protrude from the case in which the active element is enclosed. For this purpose, the binding post is provided with a reduced unitary tip at the inner part thereof extending through a corresponding aperture in the tab, and where the latter is provided with a reinforce strip, also through a corresponding aperture in the latter, over which the tip is upset preferably against a metal washer, thus to pre-assemble the binding post with the tab.

Preferably the feature of the reinforce strip and of the pre-assembly of the binding post therewith are employed conjointly, and while these features may be applied only to the anode foil they are advantageously applied both to the anode and the cathode foil of the condenser or other electrolytic apparatus to which the invention is applicable.

In the accompanying drawing in which is shown one of various possible embodiments of the several features of the invention:

Fig. 1 is a perspective view of an end of the electrode foil showing the protruding terminal tab, Fig. 2 is a perspective view showing the reinforce strip affixed thereto, and the binding post applied in a preferred anode construction, Fig. 3 is a perspective view of the end of a desirable cathode construction, Fig. 4 is a transverse sectional view of a condenser embodying the electrodes shown in the other figures, Fig. 5 is a view similar to Fig. 4 of an alternative embodiment, and Fig. 6 is a perspective view of the binding post prior to installation thereof.

Referring now to the drawing there is shown in Fig. 1 a fragment of an electrode foil 10 of extremely thin stock, from .001 inch or even less to .004 inch in thickness.

The end of the foil is transversely slit as at 11 for almost the width of the foil and the tongue thus formed is reversely bent to protrude as a tab 13 from the lateral edge of the foil. The tab and its root 12 are then turned over or reversed laterally as indicated in Fig. 1 so that the outer edge of the tab lies flush with the slit and edge of the foil. With the extremely thin stock thus used the tab is mechanically feeble and too readily torn in the ordinary process of handling during assembly of the electric unit or in the course of use.

According to the present invention a reinforce strip 14 preferably of the width of the tab, and of a length equal to the combined width of the foil and length of protruding tab, is superposed over the foil and tab. The reinforce is firmly secured to the foil and tab, preferably by means of solid rivets, three of which are shown, one, the rivet 15, extending through the base end of the reinforce strip 14 and the foil 10, another, the rivet 16, extending through the reinforce strip 14 and the triple thickness of foil near the upper edge of the electrode, which thickness is determined by the foil itself, the tab 13 and the reversed root 12 of the tab, and a third rivet 17 extends through the tab 13 and the reinforce backing 14 of the tab.

While the reinforce strip 14 may be of flexible non-metallic stock it is preferred to use a reinforce strip of metal and for most purposes of the same metal as the foil itself, but preferably of heavier stock. To avoid undesirable galvanic action the rivets are also preferably made of the same metal as the foil and the reinforce strip.

In the application to the anode of electrolytic rectifiers or to the cathode and anode of electrically formed condensers, all elements thus far described are preferably of aluminum.

Referring further to Fig. 2 and to Fig. 6 there is shown an arrangement whereby the binding post is preassembled with the terminal tab of the foil. In this instance the binding post B comprises a threaded shank 20 and an enlarged head 21 flattened at 22 for restraint against turning when installed. The head is provided with a unitary tip 23 of reduced diameter extending from the head in a direction opposite the shank and preferably somewhat out of alignment with respect to the shank. The extremity of the terminal tab 13 has an aperture 24 through which the tip 23 extends and the reinforce strip 14 has a corresponding aperture 25 also about the tip 23. A metal washer 26 encircles the tip and the extremity of the latter is upset or rolled or turned over as at 27 against the washer to effect a secure mechanical and electrical connection between the tab and the binding post.

In the application to electrolytic cells or the like, it is understood that the binding post B with its tip 23 and the washer 26 will all be made of the same metal as the anode foils, ordinarily of aluminum.

In a preferred specific application of condenser shown in Fig. 4, the construction of cathode foil specifically shown in Fig. 3 is somewhat simpler than the anode foil previously described. The cathode foil 30, also of aluminum, is devoid of any integral tab but has directly riveted thereto as by aluminum rivets 31 a reinforce strip 32 of heavier stock which protrudes to form the elongated tab 33. The tab 33 in this instance is devoid of any binding post connection. The tab may be and preferably is laterally reversed to afford a folded foil edge (not shown).

Referring to Fig. 4, the anode foil 10 as previously described and shown has superposed thereover a sheet of gauze 36 over which in turn is superposed a cathode foil 30 as shown in Fig. 4 and above described. The superposed cathode and anode foil with the interposed gauze are enrolled as shown in Fig. 4 with the cathode preferably at the exterior and the terminal tab 33 of the latter protruding from the lower end of the roll and the terminal tab of the anode foil, with its pre-assembled binding post protruding from the upper end of the roll. The roll is impregnated with electrolyte, then formed in a manner fully described in the prior patent to Georgiev 1,789,949 of January 20, 1931. Thereupon the active condenser element thus described, is enclosed preferably in a metal can 40 having an insulating cover 41 resting at its rim upon an inturned bead 42 in the can. The terminal tab of the cathode foil is brought upward around the bottom of the roll from within the can and upward past the bead 42 to be pressed by the cover 41 into secure mechanical and electrical contact with the can. The binding post B of the anode extends through a central aperture 43 in the cover, with the flat 22 of its head against the shoulder 44 molded in the insulating cover and by which the binding post is retained against turning. A coacting nut 45 at the protruding part of the shank serves to clamp the binding post against the cover. The upper edge of the can is rolled inward at 46 to firmly secure the cover in position.

The unit as thus far described affords a tremendous electrode surface area within a small can, since the extremely thin cathode and anode foil render possible the inclusion of a multiplicity of convolutions as compared with the use of thicker foil.

By reason of the reinforce on the anode tab, tearing in handling is avoided. In the clamping in position both of the anode tab to the binding post as shown in Figs. 3 and 4 and the clamping of the cathode tab between the cover and the can as shown in Fig. 4 substantially only compressive force is exerted against the surface of the tab without destructive torsional or twisting strain.

In the anode construction described, the tab 13 which serves as a foundation for mounting the reinforce 14 is an integral part of the foil, so that reliability of electric connection does not in the least depend upon the security of rivets or other mechanical connections. Only because such reliable connection is of less importance at the cathode, is the unitary tab dispensed with at that electrode.

By the arrangement described no deleterious galvanic action can occur since as set forth, particularly in the condenser application, all metallic parts of any character whatsoever used in the unit are of aluminum. Preferably as disclosed in the prior Georgiev patent above identified all of the aluminum parts associated with the anode are preformed.

In Fig. 5 is shown an alternative embodiment in which the cathode and the anode both are of identical construction provided respectively with binding posts B' and B² pre-assembled to the respective terminal tabs t' and t², said binding posts both extending through the insulating cover C and affixed by nuts N. In this case the can does not serve as the negative terminal as in the embodiment of Fig. 6 and the can or container may therefore be of non-metallic structure.

While the invention has been described as particularly applied to an electrolytically formed condenser, the advantage of extremely thin foil with the saving of expense and of volume in producing, a tremendous area of electrode is also attained in the application of this idea to electrostatic condensers of the type that do not involve any electrolytic action either prior to or during use of the apparatus. The invention is also applicable to electrolytic apparatus of various types including primary batteries and secondary batteries.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:

1. As an article of manufacture, an electrode element for an electric condenser of the enrolled type comprising an elongated strip of thin metal foil, said strip being transversely slit near one end thereof, affording a tab reversely bent to project along one end of said foil, said tab being laterally turned over to bring the outer edge of the terminal tab into alignment with the outer edge of the foil, a reinforce strip extending the width of said foil and the length of the protruding tab and means securing said strip to said foil and said tab.

2. An electrolytically formed cell of the dry enrolled type including an elongated blank of metal serving as the anode, an elongated blank of thin foil serving as the cathode, a fibrous separator sheet between said foils having electrolyte soaked therein, said foils enrolled, the end of said anode foil being transversely slit and the resultant tongue folded over to protrude as a tab from the long edge of the condenser and laterally turned over to bring the outer longitudinal edge of the tab into alignment with the extreme edge of the foil, a metal reinforce strip extending the width of the anode foil and the length of the protruding tab and metal rivets affixing said strip to said foil end and to said tab.

3. An electrolytically formed condenser comprising aluminum foils, each consisting of an elongated rectangular blank of very thin stock, one serving as the cathode and the other as the anode, said foils closely enrolled with electrolyte between the successive convolutions and aiding to maintain the foils out of short circuiting contact, each of said electrodes having a terminal tab protruding from one end thereof, the anode tab having a portion integral with the corresponding foil and constituting a protruding tongue slit and reversely bent from the metal of the foil to protrude from the end of the roll, said tab laterally turned over to bring the edge thereof substantially to alignment with the edge of the corresponding foil and a reinforce strip of aluminum stock heavier than the foil extending along the lateral edge of the cathode foil and protruding therebeyond to form a cathode terminal tab, and a reinforce strip of stock heavier than the foils extending the width of the anode foil and overlapping the length of the corresponding tab, and aluminum rivets securing the respective reinforce strips to the corresponding foils and tab.

4. An electrolytically formed condenser including a cylindrical case of film-forming metal, an insulating cover therefor, an active capacity-producing unit within said case including enrolled cathode and anode foils of film-forming metal with an intervening electrolyte-impregnated spacer, the anode having a tab unitary therewith and protruding from the upper edge thereof, a reinforce strip of the same metal as said anode rigidly secured thereto along the end of said anode foil and along the length of said tab, a binding post extending through the insulating cover, means mechanically forcing the reinforced anode tab against the binding post, the cathode having a reinforce strip of the same metal as said cathode extending along one end thereof and rigidly secured thereto and having its free end protruding therebeyond, said free end constituting a terminal tab folded about the length of the condenser roll along the inner wall of the can and pressed into electrical contact with said can by said cover.

5. A terminal for electrolytic condenser foils comprising a terminal member, a condenser foil wrapped directly around said terminal member to provide one or more folds in said foil and direct contact with said member engaged within one or more of said folds and means securing said member to said foil within the folded area of the latter.

6. A terminal for electrolytic condenser foils comprising a terminal member having a flattened portion, a condenser foil wrapped directly around said terminal member to provide one or more folds in said foil and direct contact with said member engaged within one or more of said folds and means securing said member to said foil within the folded area of the latter.

ALEXANDER GEORGIEV.